United States Patent [19]

DeGrado

[11] 4,002,817
[45] Jan. 11, 1977

[54] GAS CABLE WITH COMPRESSION TYPE PULLING ASSEMBLY

[75] Inventor: Costabile DeGrado, Elmwood Park, N.J.

[73] Assignee: The Okonite Company, Ramsey, N.J.

[22] Filed: Dec. 31, 1975

[21] Appl. No.: 645,532

[52] U.S. Cl. .................................. 174/10; 174/19; 174/79; 254/134.3 R
[51] Int. Cl.² .................... H02G 1/00; H02G 15/22
[58] Field of Search ............. 174/10, 19, 20, 25 G, 174/26 G, 74 R, 79; 254/134.3 R, 134.3 FT

[56] References Cited

UNITED STATES PATENTS

| | | | |
|---|---|---|---|
| 1,892,551 | 12/1932 | Hayman et al. | 174/10 X |
| 2,615,074 | 10/1952 | Bronovicki | 174/10 |
| 2,831,911 | 4/1958 | Winters | 174/19 X |

FOREIGN PATENTS OR APPLICATIONS

| | | | |
|---|---|---|---|
| 261,002 | 10/1963 | Australia | 174/19 |

*Primary Examiner*—Laramie E. Askin
*Attorney, Agent, or Firm*—Stephen B. Judlowe; James M. Rhodes, Jr.

[57] ABSTRACT

A pulling assembly for gas cables and a method for manufacturing such an assembly is herein disclosed. A hollow cylindrical shell is provided with a cylindrical opening at one axial end and a reduced diameter threaded axial opening at the other terminal end. A pulling eye is provided having a passageway formed generally coaxially within a shank portion thereof and extending to the body of the eye wherein a transversely disposed threaded opening is formed to communicate with the coaxial passageway. The shank is threaded for mating engagement within complementary threads formed in the second axial end of the shell. Stainless steel tubing, or the like, is soldered within the coaxial passageway of the pulling eye. The cable to which the assembly is to be connected is stripped and the shell is inserted over the conductors with the shell tubing inserted within the central interstice of the cable. The shell is crimped onto the conductors and the stripped portions of the cable repositioned over the shell. Thereafter, the entire assembly is lead soldered so as to hermetically seal the cable.

5 Claims, 13 Drawing Figures

GAS CABLE WITH COMPRESSION TYPE PULLING ASSEMBLY

BACKGROUND OF THE INVENTION

The present invention relates to pulling connectors for cables and more particularly relates to a compression type pulling assembly for gas cables. The assembly is especially adaptable to and beneficial when used in association with a multi-conductor, low or medium pressure gas cable having compact sector type aluminum conductors.

When gas cable is manufactured, it is necessary to flush the cable with nitrogen gas from end to end. In handling such cable it is also necessary to have some means for readily connecting the end thereof to a means for pulling or handling such cable.

Furthermore, such cable must be shipped under positive gas pressure and some means must be provided to permit the checking of the gas pressure from time to time.

It would therefore be advantageous if a workable method were developed for attaching a pulling eye (or bolt) to the terminal end of a cable which eye would enable a positive hermetical seal to be formed about the terminal end of the conductors and which pulling eye, itself, may be used to receive the gas for the cable and further used to receive a gage for checking the gas pressure.

This situation has been confronting the industry for some time now and the problems associated therewith have been found to be exceptionally acute when the conductors are formed of aluminum material.

OBJECTS AND SUMMARY OF THE INVENTION

It is therefore an object of the present invention to provide a pulling assembly for gas cables which assembly may be used to hermetically seal the gas cable, to receive gas for the cable and to receive a pressure gage for checking the cable pressure from time to time.

It is a further object of the present invention to provide such a pulling assembly for gas cables which is uniquely uncomplicated.

It is still a further object of the present invention to provide a pulling assembly for gas cables which is especially effective when used in association with aluminum conductors.

It is yet a further object of the present invention to provide a pulling assembly for gas cables which solves many of the problems confronting industry today regarding the manufacture and transportation of gas cables.

At least some of the above mentioned objects are achieved by the provision of a pulling assembly for gas cables including a cylindrical shell member. The shell member is provided with an axial opening at one terminal end for receiving the conductors and a threaded axial opening at the other terminal end for receiving an eye bolt. The eye bolt is formed with a coaxial passageway extending through the shank portion thereof to a transversely aligned threaded passageway in the body portion of the eye. The eye bolt is threadly engaged within the shell and a stainless steel tube, which has been soldered within the coaxial passageway of the eye, is inserted into the central interstice of the cable. The shell is then crimped over the conductors and the various sheath elements of the cable are replaced over the shell. The entire pulling assembly is then covered with a lead solder shield in order to hermetically seal the cable.

THE DRAWINGS

While the invention is particularly pointed out and distinctly claimed in the concluding portion of the specification, a preferred embodiment is set forth in the following detailed description which may be best understood when read in connection with the accompanying drawings in which:

DETAILED DESCRIPTION OF THE PREFERRED EMBODIMENT

Figure 1:
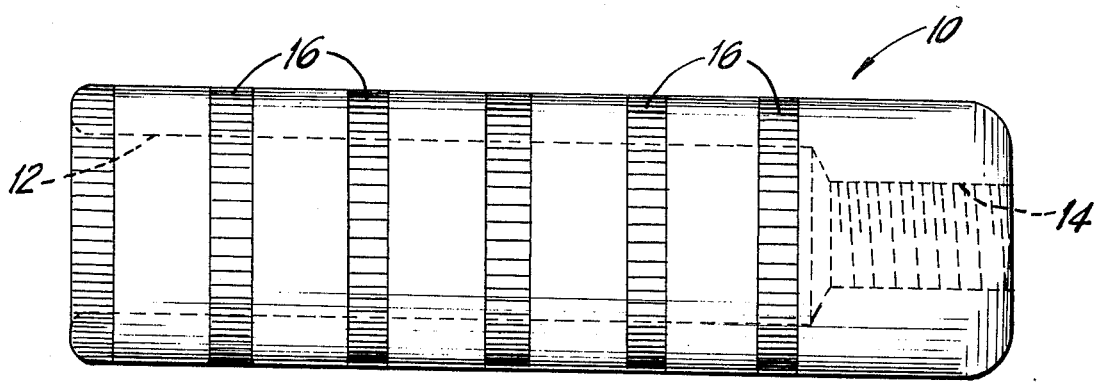
FIG. 1 shows the shell portion of a connector according to the present invention.

Referring now to the drawings in which like numerals are used to indicate like parts throughout the various views thereof, FIG. 1 shows the shell member 10 of a connector according to the present invention.

The shell member 10 is formed with an axially aligned cylindrical opening 12 extending to one axial end thereof. A coaxially extending threaded opening 14 is provided at the other axial end of the shell 10. The shell may be formed with a light knurl indicated at 16 in order to facilitate the threaded mating of elements within the threaded opening 14 and to facilitate the equispacing of the crimps.

Figure 2:
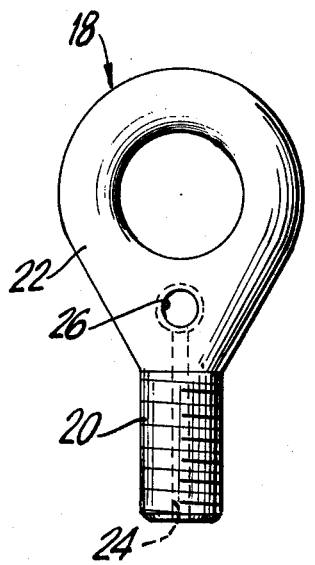
FIG. 2 shows an eye bolt modified in accordance with the present invention for threaded engagement within the shell portion shown in FIG. 1.

Referring now to FIG. 2, an eye bolt 18 is shown having a shank portion 20 and a body portion 22. A cylindrical passageway 24 may be formed generally coaxially within the shank portion 20 of the eye bolt to extend into the body portion thereof. A second passageway 26 may be formed in the body portion 18 to extend generally transversely of and in communication with the coaxial passageway 24. The threaded passageway 26 may be formed by drilling and tapping with a 7/16 inch right hand thread (typical). The shank portion 20 of the overall eye bolt may be formed with a left handed thread suitable for threaded engagement within the threaded opening 14 of the shell member 10.

Figure 3:
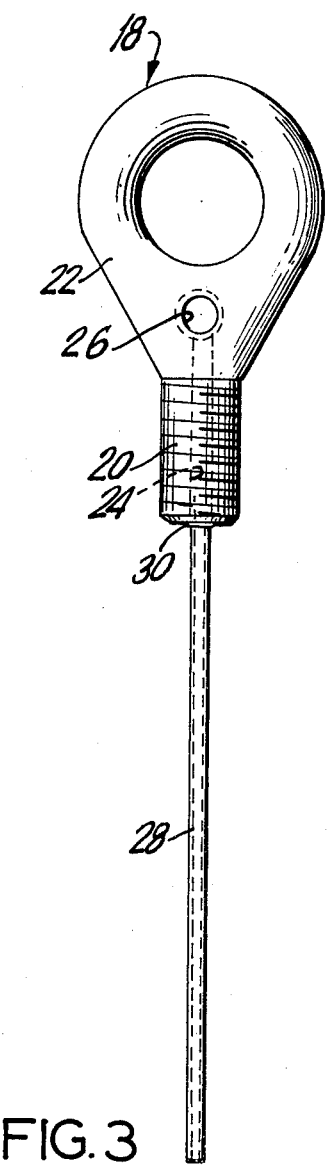
FIG. 3 shows the eye bolt of FIG. 2 with a stainless steel tube inserted therein in accordance with the present invention.

Referring now to FIG. 3 the modified eye bolt 18 is shown with a stainless steel tube 28 engaged within the coaxial passageway 24 and sealed therein by a silver solder shown as joint 30. The tubing 28 may be approximately 6 inches long and should extend into the opening 24 for approximately a ¼ inch of axial distance.

Figure 4:
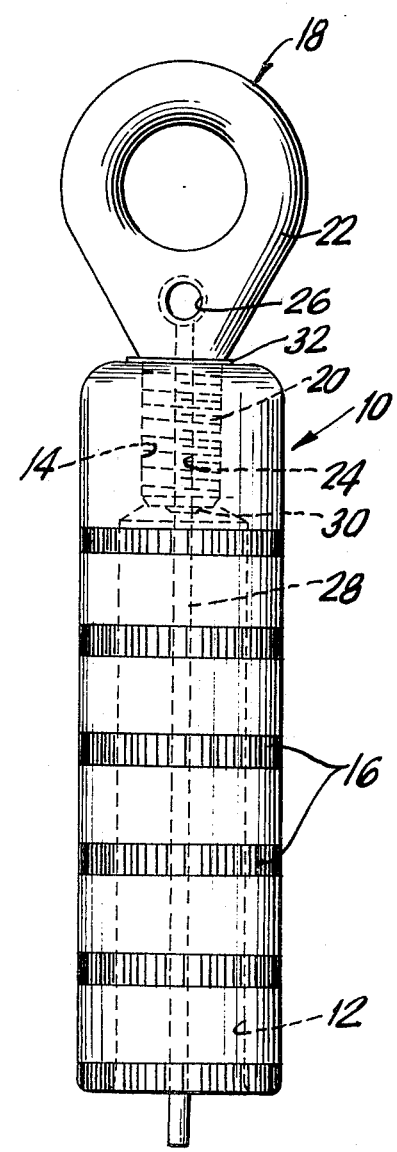
FIG. 4 shows the eye bolt and shell of the present invention in an operational posture.

Referring now to FIG. 4, the overall connector member according to the present invention is shown in an assembled posture except for the final connection thereof to a cable. It can be seen that the overall eye bolt member 18 is threadedly engaged within a shell member 10 and that the stainless steel tubing 28 now extends generally coaxially through the shell member 10 and extends some distance beyond the terminal end forming the axial opening 12.

After the overall eye bolt 18 has been threadedly mated within the shell member 10, soft solder is applied at the outside junction between the eye bolt 18 and shell 10 to form joint 32. The overall connector is then ready for attachment to the terminal end of a conductor.

Figure 5A:
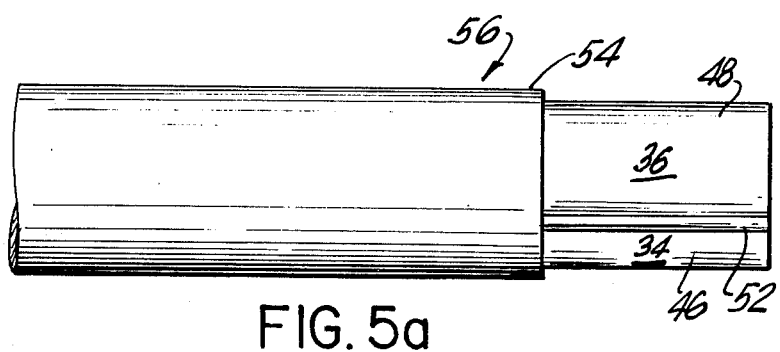
FIG. 5a is a longitudinal view of compact sector type aluminum cable and FIG. 5b is a cross-sectional view of the same, for which the present invention is especially suitable.
Figure 5B:
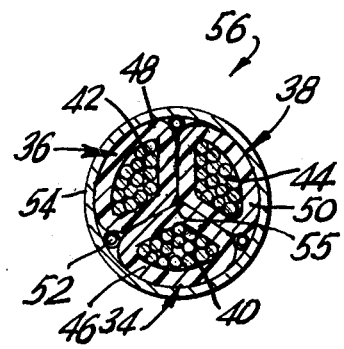

Referring now to FIG. 5b, a gas cable is shown in cross section which cable is of the type having compact sector type aluminum conductors.

In FIG. 5a three sectors 34, 36 and 38 are shown having aluminum conductors 40, 42 and 44, respectively. Individual insulation sheaths 46, 48 and 50 are provided for each conductor 40, 42 and 44, respectively. Spiralling copper tubing 52 may be disposed about the cluster of sectors 34, 36 and 38, and a lead sheath 54 may be used to enclose the entire cable assembly.

Figure 6:
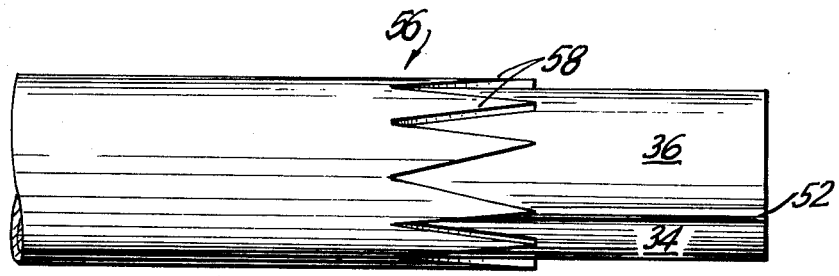
FIG. 6 shows the first step in preparing cable to receive a connector according to the present invention.

Referring now to FIG. 6, the first step in preparing a cable 56 for receiving a connector as shown in FIG. 4 is shown. Specifically, approximtely 6 inches of the lead sheath 54 has been removed from the conductor cluster.

Figure 7:
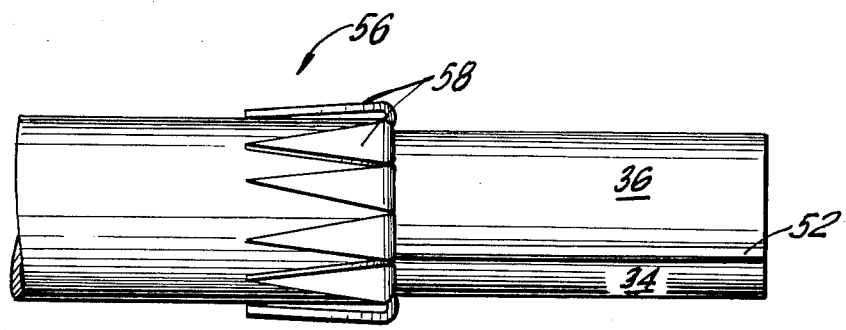
FIG. 7 shows the second step in preparing cable to receive the connector according to the present invention.

Referring still to FIG. 6, it can be seen that the stripped end of the lead sheath is scalloped as indicated at 58 and, referring to FIG. 7 it can be seen that the triangular members of the scalloped configuration 58 have been folded back.

Figure 8:
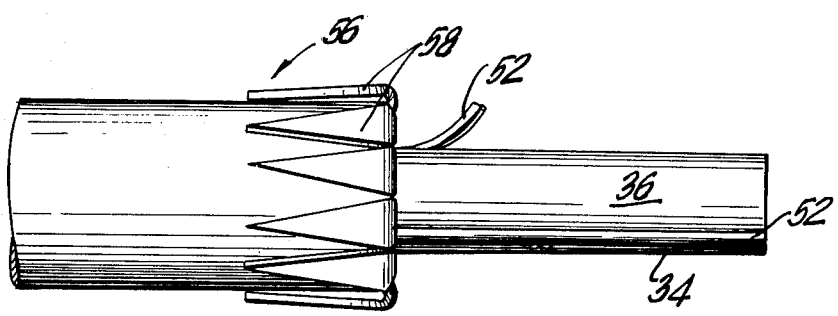
FIG. 8 shows the third step in preparing cable to receive the connector according to the present invention.

Referring now to FIG. 8, it can be seen that copper tubing 52 is flattened and also folded back in order to leave the sectors 34, 36 and 38 stripped for receiving the shell portion 10 of an overall eye bolt connector according to the present invention.

Figure 9:
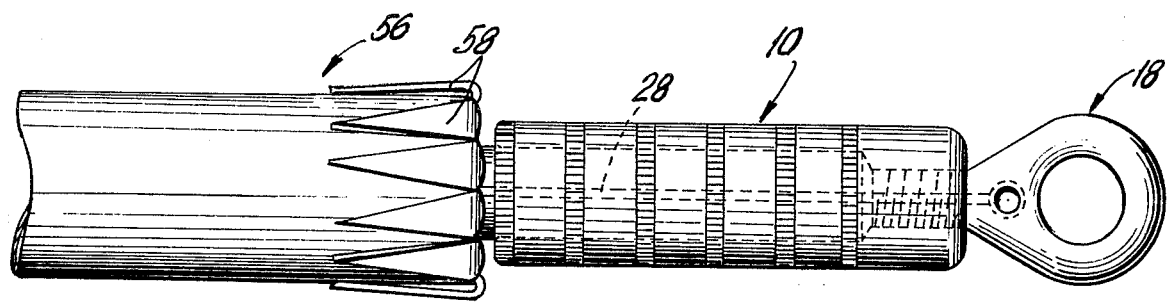
FIG. 9 shows the fourth step in attaching a connector according to the present invention.

Referring to FIG. 9, the stripped cable of FIG. 8 is shown with the overall connector according to the present invention in an operational posture. Specifically, the shell 10 is slidingly engaged over the conductor sectors 34, 36 and 38 and the stainless steel tube 28 is inserted within the central interstice 55 defined by the conductors.

Figure 10:
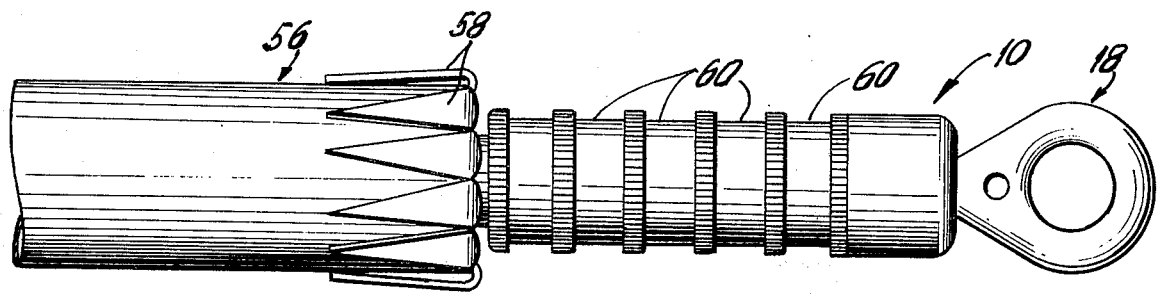
FIG. 10 shows the fifth step in attaching a connector according to the present invention.

By reference to FIG. 10 it can be seen that the shell member 10 is radially crimped onto the conductors so as to form spaced circumferentially extending equispaced crimped bands 60 of material.

Figure 11:
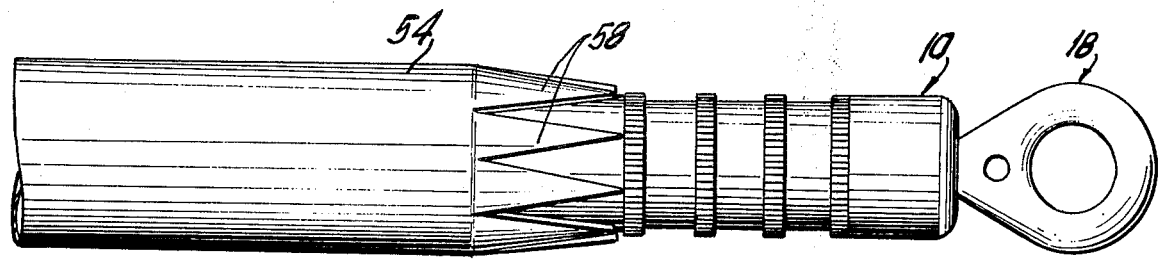
FIG. 11 shows the sixth step in attaching a connector according to the present invention.

Referring to FIG. 11, the scalloped portions 58 of the lead sheath 54 are folded back onto the shell portion 10 of the connector assembly as is the end of copper tubing (not shown) which is disposed under the lead sheath 54.

Figure 12:
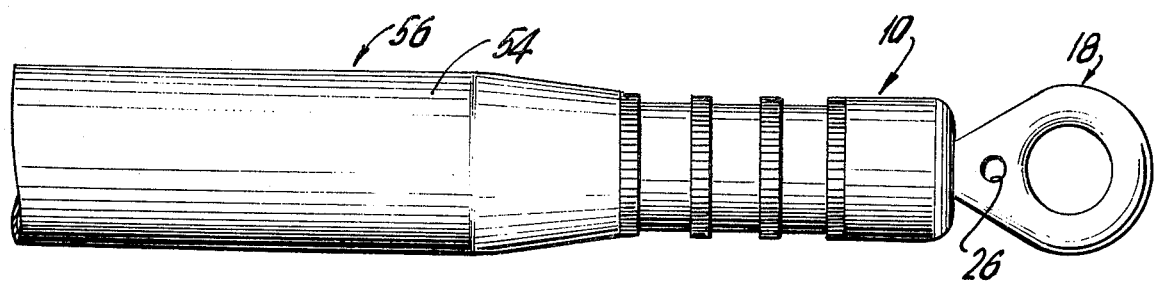
FIG. 12 shows the overall final assembly according to the present invention.

FIG. 12 shows the arrangement of FIG. 11 with a layer of lead solder sealing an area extending from below the scalloped portions of the lead sheath up to and onto the shell portion 10 of the overall connector.

When the connector has been attached as shown in FIG. 12, the threaded opening 26 may be used to threadedly engage a source of gas for injection into the cable through the tube 28. The opening 26 may also be used to receive a plug for hermetically sealing the overall end of the cable or for receiving a pressure gage for monitoring the pressure within the cable either during transit or upon delivery and installation.

It can thus be seen that a pulling assembly has been herein described for use in association with gas cables. Also, a method for manufacturing such a pulling assembly has been disclosed in detail.

The pulling assembly according to the present invention is uniquely uncomplicated and especially effective in dealing with the very difficult problems encountered when working with aluminum conductors.

The pulling assembly according to the present invention permits one to attach the terminal end of a gas cable to any pulling means while at the same time permitting one to inject gas into the cable, to measure the pressure of gas within the cable or to simply plug up the opening 26 to hermetically seal whatever gas is in the cable.

While what has been described herein is a preferred embodiment of the present invention, it is to be understood that various modifications and changes may be made therein without departing from the true spirit and scope of the present invention. It is therefore intended to cover in the following claims all such modifications and changes as may fall within the true spirit and scope of the present invention.

What is claimed is:

1. A multiconductor, gas-filled cable wherein a compression type pulling assembly is attached to the end of the cable, wherein the improvement comprises:
   a. a pulling eye having gas passageway means extending generally longitudinally therethrough;
   b. a shell member having a first terminal end connected with said pulling eye and having a second terminal end receiving said multiconductor, gas-filled cable; and
   c. a tube connected to said gas passageway means of the pulling eye, extending longitudinally through the interior of said shell, and entering said multiconductor cable, for communicating gas from said gas passageway means to the interior of said multiconductor, gas-filled cable.

2. An assembly according to claim 1, wherein said gas passageway means is formed with an axially extending section and a transversely extending section within said pulling eye.

3. An assembly according to claim 2, wherein the transversely extending section is internally threaded.

4. An assembly according to claim 2, wherein said tube is attached to said pulling eye within the axially extending section of said gas passageway means and extends into the interstices of said cable.

5. An assembly according to claim 1, wherein said second terminal end of said shell member is hermetically sealed at the connection of said cable therewith.

* * * * *